(12) United States Patent
Saigo et al.

(10) Patent No.: US 10,209,518 B2
(45) Date of Patent: Feb. 19, 2019

(54) DISPLAY APPARATUS

(71) Applicant: PANASONIC INTELLECTUAL PROPERTY MANAGEMENT CO., LTD., Osaka (JP)

(72) Inventors: Katsuo Saigo, Hyogo (JP); Hiroshi Mitani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 73 days.

(21) Appl. No.: 15/226,354

(22) Filed: Aug. 2, 2016

(65) Prior Publication Data

US 2016/0341965 A1 Nov. 24, 2016

Related U.S. Application Data

(63) Continuation of application No. PCT/JP2014/005913, filed on Nov. 26, 2014.

(30) Foreign Application Priority Data

Mar. 17, 2014 (JP) .................................. 2014-053059

(51) Int. Cl.
*G02B 27/01* (2006.01)
*G02B 5/28* (2006.01)

(52) U.S. Cl.
CPC ......... *G02B 27/0172* (2013.01); *G02B 5/285* (2013.01); *G02B 2027/013* (2013.01);
(Continued)

(58) Field of Classification Search
CPC .............................. G02B 27/0172; G02B 5/285
(Continued)

(56) References Cited

U.S. PATENT DOCUMENTS 7,327,521 B2 * 2/2008 Tani ..................... G02B 27/283
348/336
2001/0010598 A1 * 8/2001 Aritake ............. G02B 27/0172
359/630
(Continued)

FOREIGN PATENT DOCUMENTS

CN 102320164 A 1/2012
CN 103064186 A 4/2013
(Continued)

OTHER PUBLICATIONS

International Search Report and Written Opinion issued in corresponding International Patent Application No. PCT/JP2014/005913, dated Jan. 13, 2015; with partial English translation.
(Continued)

*Primary Examiner* — James Greece
(74) *Attorney, Agent, or Firm* — McDermott Will & Emery LLP

(57) ABSTRACT

The present disclosure provides a display apparatus, in which a shift of a transmission or reflection wavelength characteristic due to an incident angle of light is suppressed, and observation of external light necessary for display and image light necessary for display is possible. The display apparatus of the present disclosure includes an image light generator that generates image light by use of light in each of at least a first wavelength band, a second wavelength band, and a third wavelength band, and a light synthesizing part that transmits external light and reflects the image light. The light synthesizing part has a transparent substrate having a concave surface on which the image light is reflected, and a film that is provided on the concave surface of the substrate, reflects the image light, and transmits light in a predetermined wavelength band of the external light.

4 Claims, 9 Drawing Sheets

(52) U.S. Cl.
CPC ............... *G02B 2027/0112* (2013.01); *G02B 2027/0118* (2013.01); *G02B 2027/0143* (2013.01); *G02B 2027/0174* (2013.01); *G02B 2027/0178* (2013.01)

(58) Field of Classification Search
USPC .......................................................... 359/631
See application file for complete search history.

(56) References Cited

U.S. PATENT DOCUMENTS

2010/0157433 A1\* 6/2010 Mukawa ............ G02B 27/0172
359/633
2014/0049831 A1\* 2/2014 Takeda ............... G02B 27/0172
359/630

FOREIGN PATENT DOCUMENTS

| | | |
|---|---|---|
| CN | 103592762 A | 2/2014 |
| JP | 2002-098928 A | 4/2002 |
| JP | 2008-015970 A | 1/2008 |
| JP | 2010-145721 A | 7/2010 |
| JP | 2013-238634 A | 11/2013 |
| JP | 2014-038239 A | 2/2014 |

OTHER PUBLICATIONS

English Translation of Chinese Search Report dated Oct. 27, 2017 for the related Chinese Patent Application No. 201480072564.4.
English Translation of Chinese Search Report dated Jun. 13, 2018 for the related Chinese Patent Application No. 201480072564.4.

\* cited by examiner

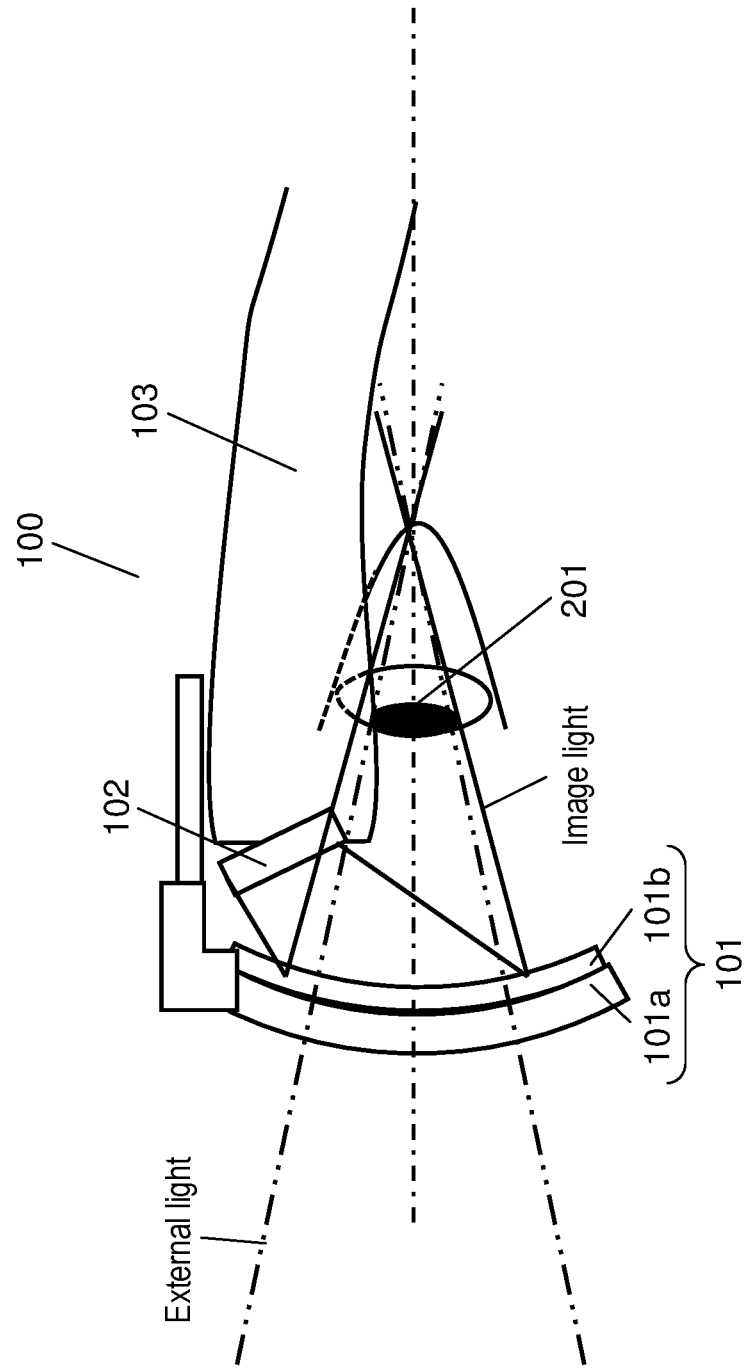

FIG. 5

| Color of LED of signal | Peak wavelength |
|---|---|
| Blue | 500nm |
| Yellow | 595nm |
| Red | 630nm |

DISPLAY APPARATUS

RELATED APPLICATIONS

This application is a Continuation of International Patent Application No. PCT/JP2014/005913, filed on Nov. 26, 2014, which in turn claims the benefit of Japanese Application No. 2014-053059, filed on Mar. 17, 2014, the disclosures of which Applications are incorporated by reference herein.

BACKGROUND

1. Technical Field

The present disclosure relates to a display apparatus in which an image can be overlapped with an external field to be observed.

2. Description of Related Art

Unexamined Japanese Patent Publication No. 2010-145721 discloses a head mounted display (HMD) using a combiner which uses a film formed on a flat transparent base material and having reflection and transmission characteristics, transmits external light and reflects image light from a display device in a direction of a pupil of an observer at the same time, and overlaps an image with an external field to enable observation.

As the combiner, a diffractive reflection type holo-graphic optical element (HOE) having wavelength-selectivity as a reflection and transmission film on a flat surface is disclosed.

SUMMARY

However, the HOE has not only the wavelength-selectivity, but also angle selectivity. In a combiner of a HOE having a narrow reflection wavelength region, a peak wavelength of diffractive reflection shifts depending on an angle at which image light enters a combiner surface. Particularly, in a case where an angle of view of image light is wide, when peak wavelengths of refractive reflection at vertical or horizontal both ends of the angle of view shift compared to a peak wavelength of diffractive reflection at a center of the angle of view, and a reflective diffracted wavelength region is partially overlapped between wavelengths of red (R), green (G), blue (B) of image light, and the image light whose reflective diffracted wavelength region is partially overlapped enters a pupil of a person, the image light becomes ghost light.

The present disclosure provides a display apparatus, in which a shift of a transmission or reflection wavelength characteristic due to an incident angle of light is suppressed, and observation of external light necessary for display and image light necessary for display is possible.

The display apparatus of the present disclosure includes an image light generator that generates image light by use of light in each of at least a first wavelength band, a second wavelength band, and a third wavelength band, and a light synthesizing part that transmits external light and reflects the image light. The light synthesizing part has a transparent substrate having a concave surface on which the image light is reflected, and a film that is provided on the concave surface of the substrate, reflects the image light, and transmits light in a predetermined wavelength band of the external light.

In the display apparatus according to the present disclosure, observation of external light necessary for display and image light necessary for display is possible at a wide angle of view.

BRIEF DESCRIPTION OF DRAWINGS

FIG. 2 is a schematic diagram of the HMD used by an observer, according to the first exemplary embodiment.

FIG. 5 is a diagram illustrating a peak wavelength of a signal of LEDs.

DESCRIPTION OF EMBODIMENT

Hereinafter, an exemplary embodiment is appropriately described in detail with reference to drawings. However, an excessive detailed description may be omitted. For example, a detailed description of an already well-known matter or an overlapped description of the same configuration may be omitted. This is because of avoidance of the following description becoming an unnecessary redundant description, and facilitation of an understanding of a person skilled in the art.

The attached drawings and the following description are provided in order that a person skilled in the art sufficiently understands the present disclosure, and do not intend to limit the subject matter recited in the scope of the claims.

First Exemplary Embodiment

Hereinafter, with reference to FIGS. 1 to 9C, an exemplary embodiment is described.

[1. Configuration of Display Apparatus]

In this exemplary embodiment, an HMD that is an example of a display apparatus is described.

Figure 1A:
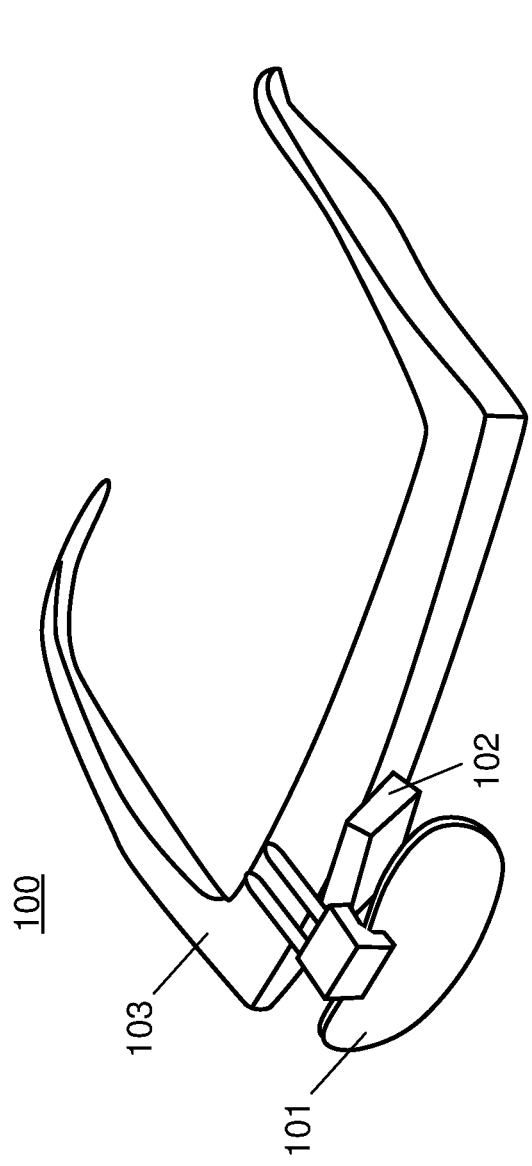
FIG. 1A is an outline drawing of an HMD according to a first exemplary embodiment.
Figure 1B:
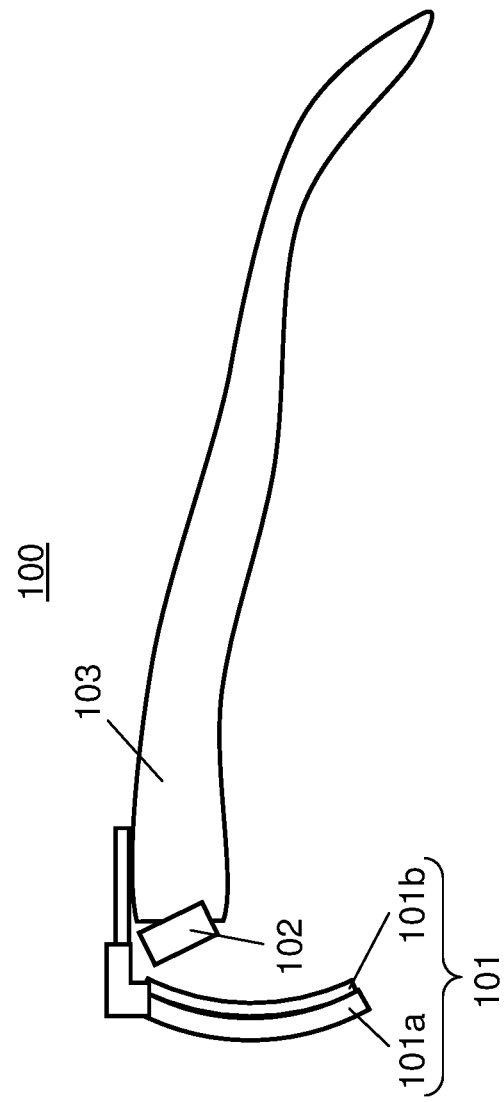
FIG. 1B is a side view of the HMD according to the first exemplary embodiment.

FIG. 1A is an outline drawing of an HMD according to a first exemplary embodiment, FIG. 1B is a side view of the HMD according to the first exemplary embodiment, and FIG. 2 is a schematic diagram of the HMD used by an observer, according to the first exemplary embodiment. HMD 100 is configured by light synthesizing part 101, image light generator 102, and support 103 for supporting the light synthesizing part and the image light generator. HMD 100 has such an outline that a lens for a left eye is removed from general glasses, for example. Light synthesizing part 101 is configured by substrate 101a and film 101b. Image light generator 102 is an optical modulator for displaying an image by modulation of light from a light source (not illustrated) based on image data, for example, a transmission type or reflection type liquid crystal display device, an MEMS (micro electro mechanical systems) mirror optical element, or an organic EL (eletro luminescence) display device, or the like.

Light synthesizing part 101 is an optical member for reflecting image light from image light generator 102 to guide reflected image light to an optical pupil 201 of an observer, and transmitting external light to guide transmitted external light to the pupil. Accordingly, the observer can overlap a virtual image of an image with an external field at a position of optical pupil 201 to observe the overlapped virtual image and external field.

[2. Characteristic of Light Synthesizing Part]

Light synthesizing part 101 is configured by transparent substrate 101a having both a reflection function and a transmission function, and having curvature R (R is a natural number of 1 or more), and wavelength-selectivity film 101b applied on a concave side of substrate 101a. Substrate 101a and wavelength-selectivity film 101b become concave mirrors, and have functions of enlarging reflected image light.

Wavelength-selectivity film 101b is, for example, a dielectric multilayer film formed by a film obtained by laminating thin films made of materials having different refractive indexes, and has wavelength-selectivity for reflecting only an arbitrary wavelength region.

The dielectric multilayer film can be formed by optical thin films made of a plurality of dielectric materials by various physical vapor deposition (PVD) including vacuum vapor deposition and sputtering, various chemical vapor deposition (CVD) including MOCVD (Metal Organic Chemical Vapor Deposition), spin coating by solution coating, or the like.

More specifically, wavelength-selectivity film 101b is configured by, for example, a multilayer film obtained by laminating a low refractive index layer, and a high refractive index layer having a higher refractive index than the low refractive index layer, for example, by alternately laminating a plurality of the low refractive index layers and a plurality of the high refractive index layers. Consequently, light transmittance depending on a wavelength of light in each of a first light reflection layer and a second light reflection layer can be changed to a desired value. Herein, examples of a material configuring the low refractive index layer include $SiO_2$ and the like, and examples of a material configuring the high refractive index layer include $Nb_2O_5$, $TiO_2$, $ZrO_2$, and the like. These dielectric materials are achromatic, and do not absorb light, and therefore entering light is not lost, and spectral reflectance can be freely set by utilization of interference of reflected light from a boundary of the layers.

Additionally, dozens of dielectric thin films are overlapped, and reflectance close to 100% to a specific wavelength can be obtained.

Accordingly, this specific wavelength is made to coincide with a wavelength of image light, so that image light can be observed, external light having a wavelength other than the specific wavelength can be transmitted, and an external field can be also observed.

As wavelength-selectivity film 101b, holographic optical element may be used. In this case, a peak wavelength of diffractive reflection is calculated in consideration of curvature R of substrate 101a.

Light synthesizing part 101 configured by substrate 101a and wavelength-selectivity film 101b desirably reflects a wavelength of image light, and widely transmits external light at the same time. Particularly, it is necessary to unblock a wavelength of illumination light for lighting an external field inside and a wavelength of a signal or the like outside. More specifically, it is necessary to unblock a wavelength of a mercury lamp or fluorescent lamp each having a peak at a specific wavelength as the illumination light, and a wavelength of a signal of LEDs (Light Emitting Diodes) outside.

Figure 3:
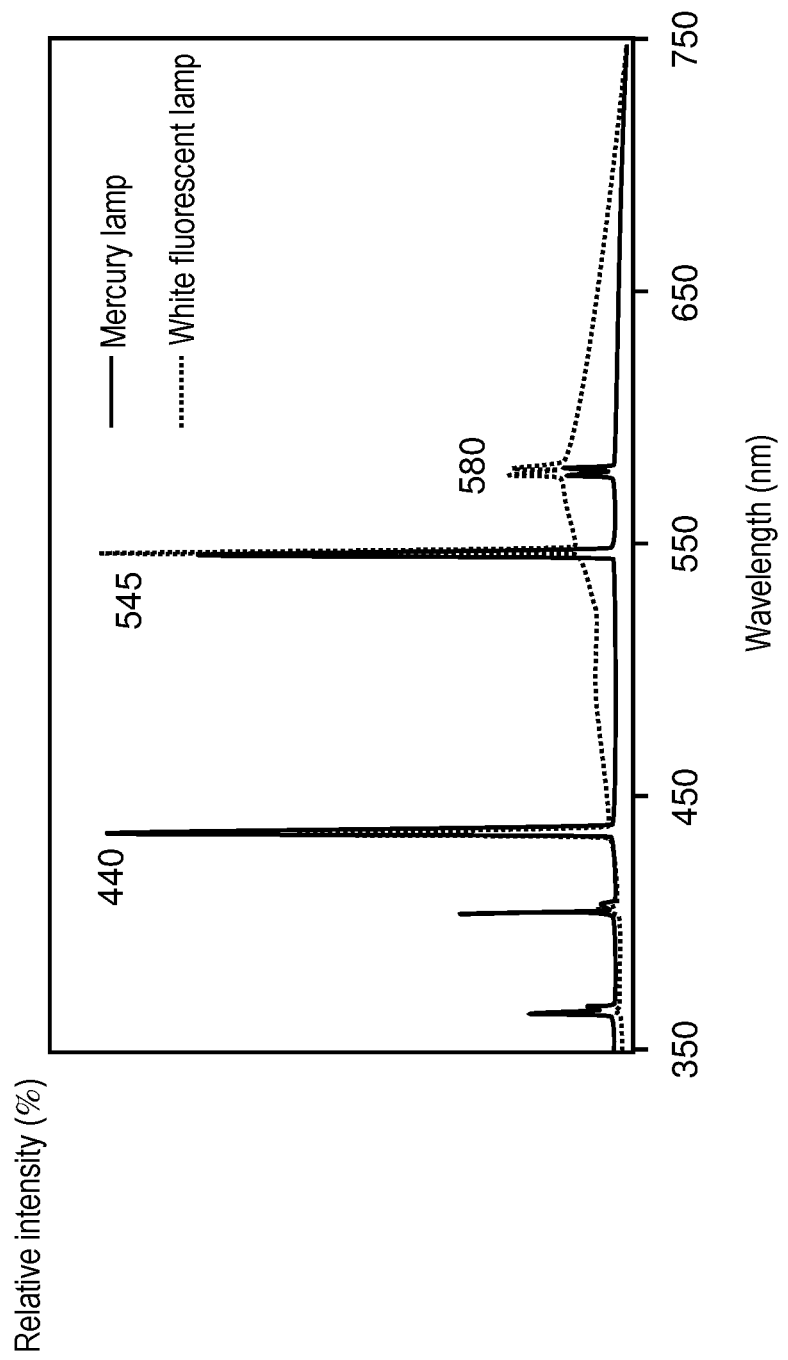
FIG. 3 is a diagram illustrating peak wavelengths of a mercury lamp and a white fluorescent lamp.

FIG. 3 is a diagram illustrating peak wavelengths of a mercury lamp and a white fluorescent lamp as an example of illumination light. Since ceilings of factories and warehouses are high, mercury lamps that are powerful light sources are widely used. Additionally, in offices and the like, white fluorescent lamps, three-wavelength fluorescent lamps, and the like are widely used.

In FIG. 3, a horizontal axis denotes a wavelength, and a vertical axis denotes relative intensity. As illustrated in FIG. 3, the mercury lamp has peak wavelengths at 440 nm, 545 nm and 580 nm within a visual wavelength range. Additionally, the white fluorescent lamp has a relatively broad characteristic, but has peak wavelengths at 440 nm, 545 nm and 580 nm, similarly to the mercury lamp.

Figure 4:
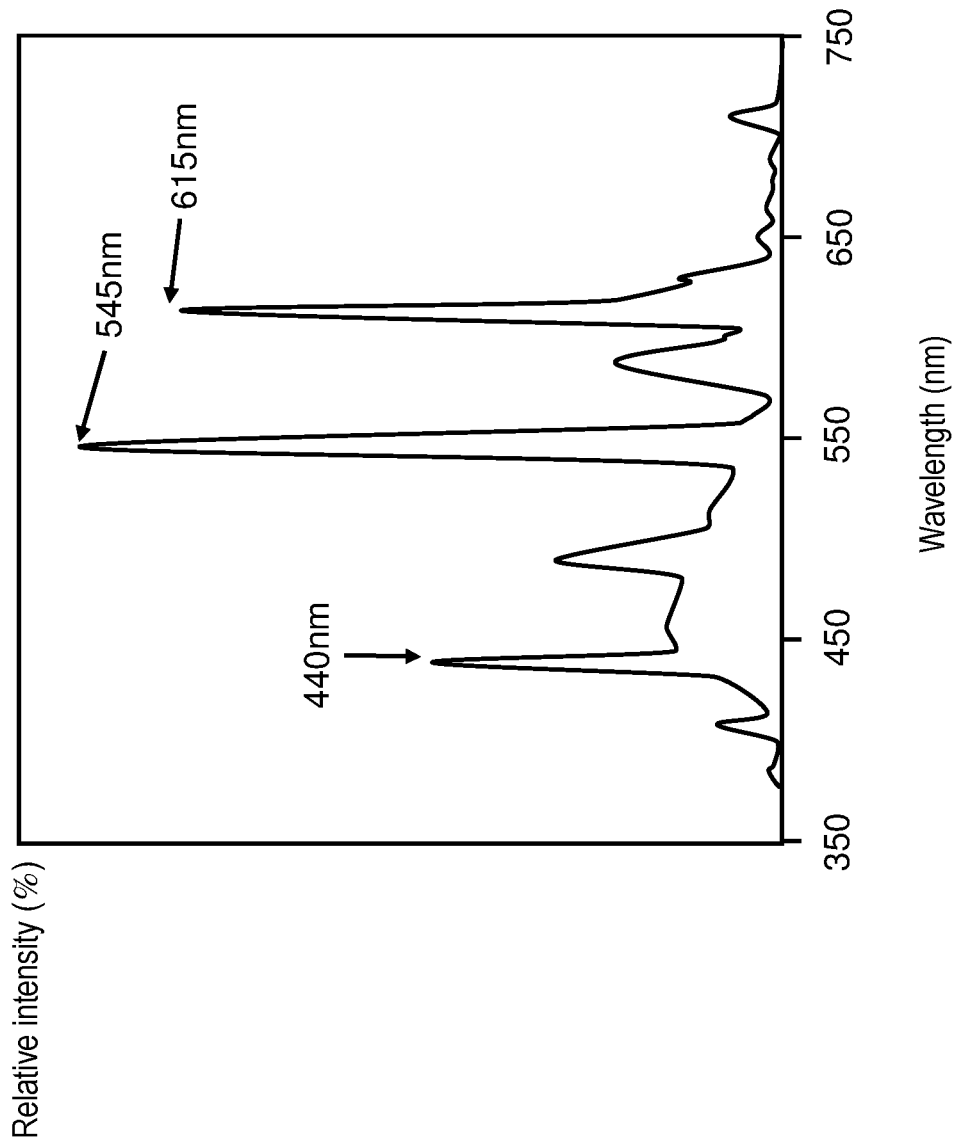
FIG. 4 is a diagram illustrating a peak wavelength of a three-wavelength fluorescent lamp.

FIG. 4 is a diagram illustrating a peak wavelength of a three-wavelength fluorescent lamp. In FIG. 4, a horizontal axis denotes a wavelength, and a vertical axis denotes relative intensity. The three-wavelength fluorescent lamp has peak wavelengths at 440 nm, 545 nm and 615 nm.

A half-value width of each of the peak wavelengths of the mercury lamp, the white fluorescent lamp, and the three-wavelength fluorescent lamp is narrow, and ±10 nm or less.

FIG. 5 is a diagram illustrating a peak wavelength of a signal of LEDs. A light source including a blue LED of the signal having a peak wavelength of 500 nm, a yellow LED of the signal having a peak wavelength of 595 nm, and a red LED of the signal having a peak wavelength of 630 nm is used.

In order to observe external light, a transmission wavelength range is taken as wide as possible. Particularly, it is necessary to reliably transmit the peak wavelengths of the mercury lamp, the white fluorescent lamp, the three-wavelength fluorescent lamp, and the LED signal. On the other hand, in order to observe image light, a light source having a wavelength which does not overlap with the above wavelengths need to be prepared as the light source of image light generator 102, and wavelength-selectivity film 101b having a wavelength of the light source as a specific wavelength needs to be formed.

Figure 6:
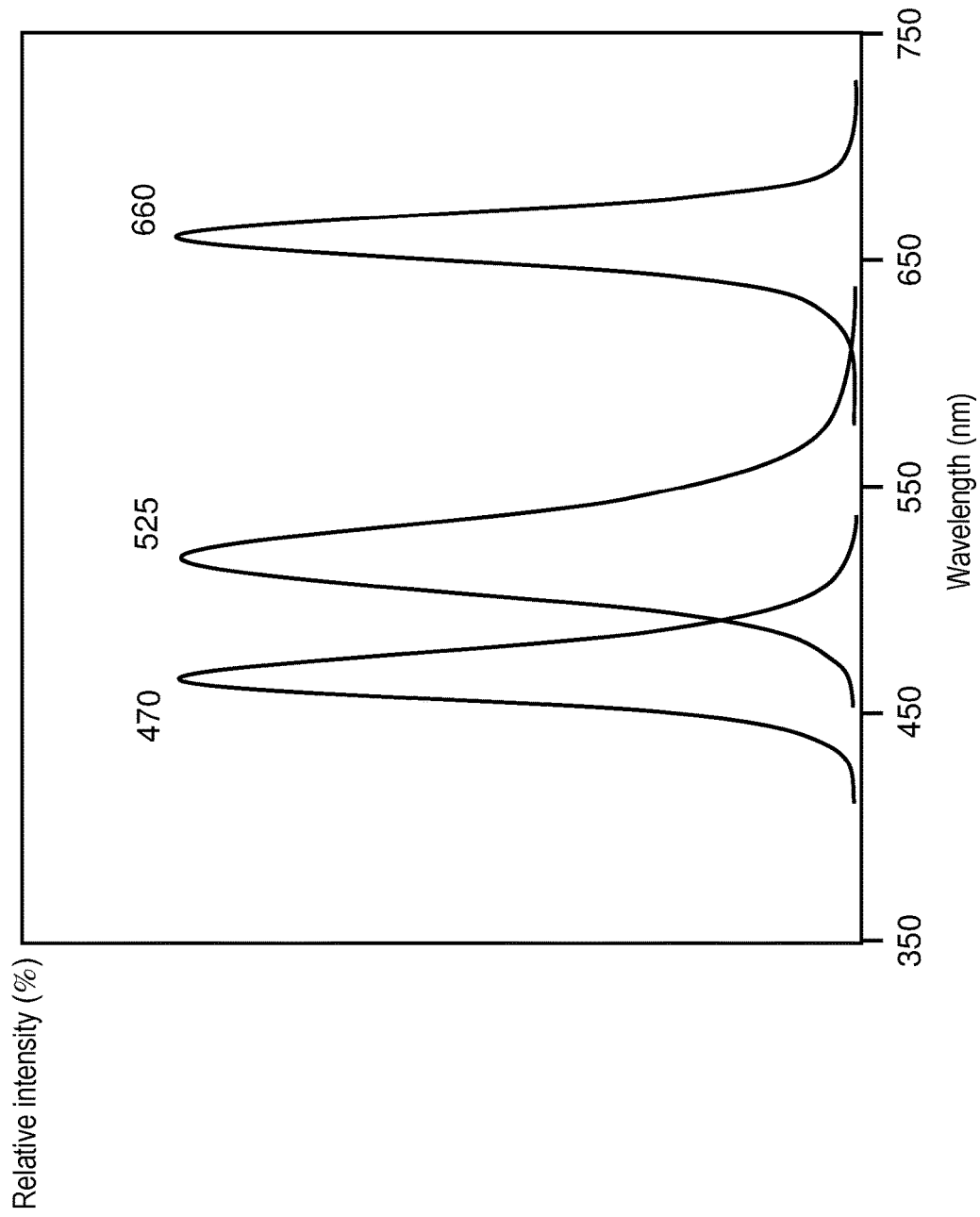
FIG. 6 is a diagram illustrating a peak wavelength of a LED light source of an image light generator according to the first exemplary embodiment.

FIG. 6 illustrates a peak wavelength of an LED light source used as the light source of image light generator 102. As the LED light source, a blue LED having a peak wavelength of 470 nm, a green LED having a peak wavelength of 525 nm, and a red LED having a peak wavelength of 660 nm is used.

Figure 7:
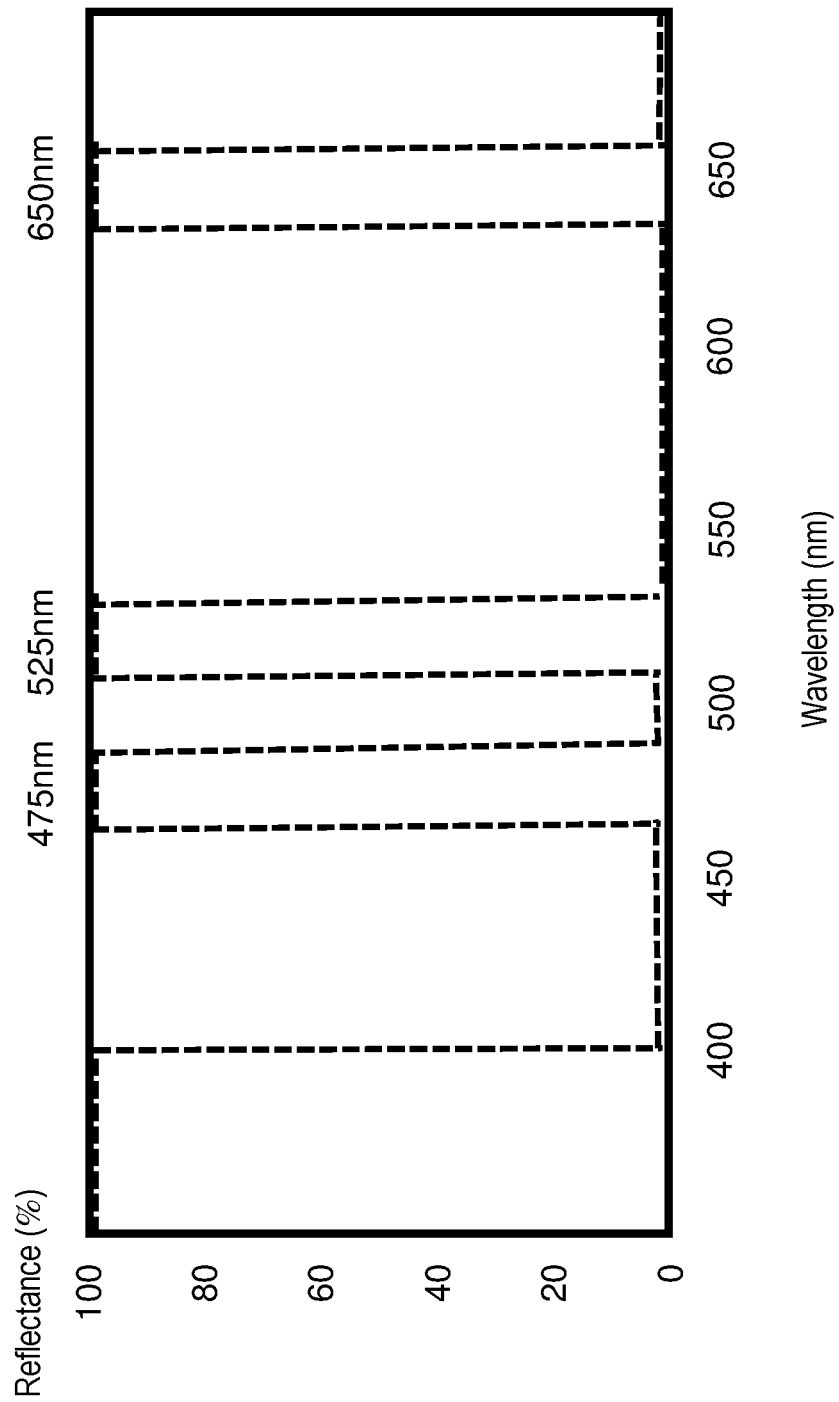
FIG. 7 is a diagram illustrating a wavelength reflection characteristic of a wavelength-selectivity film according to the first exemplary embodiment.

FIG. 7 is a diagram illustrating a wavelength reflection characteristic of wavelength-selectivity film 101b. A transmission and reflection characteristic of wavelength-selectivity film 101b is determined from 440 nm, 500 nm, 545 nm, 580 nm, 595 nm, 615 nm and 630 nm as a wavelength range in which light should be transmitted, and 470 nm, 525 nm and 660 nm as the wavelength range of the light source of image light generator 102.

In FIG. 7, formed film 101b has reflectance of nearly 100% in wavelength ranges of 475 nm±10 nm, 525 nm±10 nm, and 650 nm±10 nm, and has reflectance of nearly 0% in a visual wavelength range other than the above wavelength ranges. That is, formed film 101b has reflectance of nearly 100%. Light synthesizing part 101 formed with such wavelength-selectivity film 101b enables observation of image light necessary for display, and external light that allows reliable transmission of light of each of the mercury lamp, the white fluorescent lamp, the three-wavelength fluorescent lamp, and the LED signal.

[3. Configuration of Light Synthesizing Part]

Figure 8A:
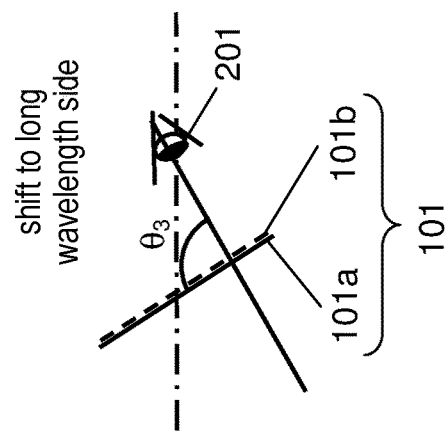
FIG. 8A is a diagram illustrating a case where a visual line direction of an observer is an upward direction in a case where a curvature of a substrate of a light synthesizing part is 0, according to the first exemplary embodiment.

Now, the curvature of light synthesizing part 101 is described. FIG. 8A is a diagram illustrating a case where a visual line direction of an observer is an upward direction in a case where the curvature of substrate 101a of light synthesizing part 101 is 0, FIG. 8B is a diagram illustrating a case where the visual line direction of the observer is a front in the case where the curvature of substrate 101a of light synthesizing part 101 is 0, and FIG. 8C is a diagram illustrating a case where the visual line direction of the observer is a downward direction in the case where the curvature of substrate 101a of light synthesizing part 101 is 0.

A dielectric multilayer film having wavelength-selectivity has incident angle dependence similarly to the holographic optical element. When light enters obliquely with respect to a thickness direction of each layer forming the dielectric multilayer film, an optical path length, in which light pass through the film, increases. Therefore, when an incident angle is 0 degrees, namely, is vertical, the transmission and reflection wavelength characteristics are on the longest wavelength side. On the other hand, when the incident angle increases, the wavelength characteristic shifts to a short wavelength side.

Figure 8B:
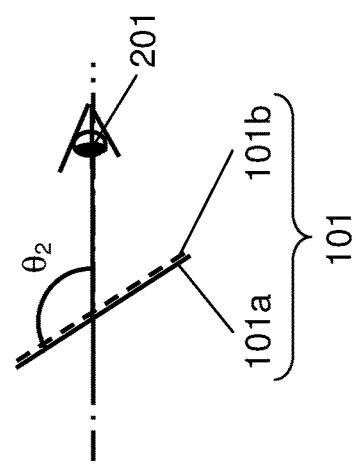
FIG. 8B is a diagram illustrating a case where the visual line direction of the observer is a front in the case where the curvature of the substrate of the light synthesizing part is 0, according to the first exemplary embodiment.
Figure 8C:
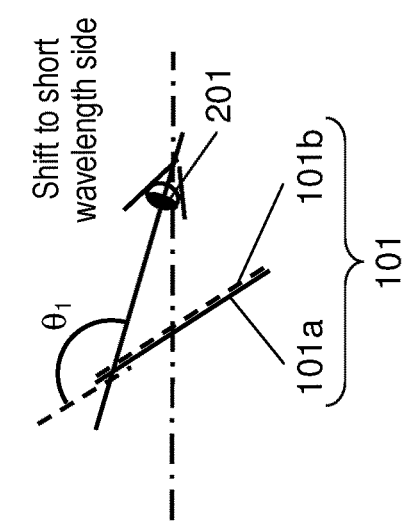
FIG. 8C is a diagram illustrating a case where the visual line direction of the observer is a downward direction in the case where the curvature of the substrate of the light synthesizing part is 0, according to the first exemplary embodiment.

More specifically, a case of light synthesizing part 101 in which wavelength-selectivity film 101b is formed on substrate 101a that is a flat transparent plate, as illustrated in FIG. 8A, FIG. 8B and FIG. 8C is described. For example, when the visual line direction of optical pupil 201 of the observer is directed upward as illustrated in FIG. 8A, incident angle $\theta_1$ degree from a pupil center to light synthesizing part 101 becomes larger than incident angle $\theta_2$ degree when the visual line direction of optical pupil 201 of the observer is directed to the front as illustrated in FIG. 8B, and a specific wavelength characteristic of wavelength-selectivity film 101b shifts to the short wavelength side. On the other hand, when the visual line direction of optical pupil 201 of the observer is directed downward as illustrated in FIG. 8C, incident angle $\theta_3$ degree from the pupil center to light synthesizing part 101 becomes smaller than incident angle $\theta_2$ degree when the visual line direction of optical pupil 201 of the observer is directed to the front, and the specific wavelength characteristic of wavelength-selectivity film 101b shifts to the long wavelength side.

The specific wavelength of wavelength-selectivity film 101b is determined based on the incident angle when the visual line direction of optical pupil 201 of the observer is directed to the front. Therefore, also in a case where the visual line of the observer is directed to right and left, the wavelength characteristic of wavelength-selectivity film 101b also shifts. When the wavelength characteristic of wavelength-selectivity film 101b greatly shifts, ghost light is likely to be seen.

Figure 9A:
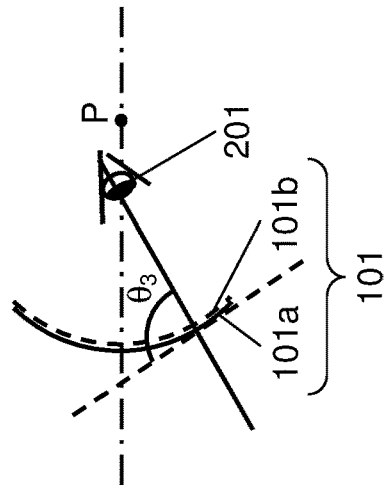
FIG. 9A is a diagram illustrating a case where the visual line direction of the observer is the upward direction in a case where the curvature of the substrate of the light synthesizing part is R, according to the first exemplary embodiment.
Figure 9B:
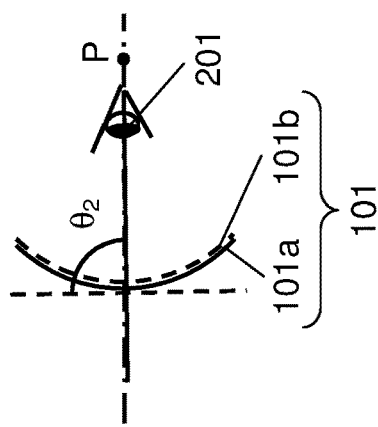
FIG. 9B is a diagram illustrating a case where the visual line direction of the observer is the front in the case where the curvature of the substrate of the light synthesizing part is R, according to the first exemplary embodiment.
Figure 9C:
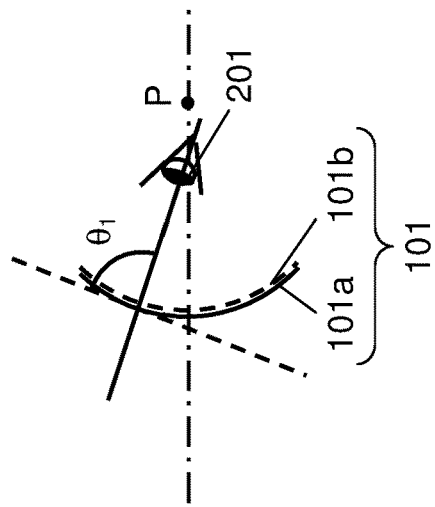
FIG. 9C is a diagram illustrating a case where the visual line direction of the observer is the downward direction in the case where the curvature of the substrate of the light synthesizing part is R, according to the first exemplary embodiment.

FIG. 9A is a diagram illustrating a case where the visual line direction of the observer is the upward direction in a case where the curvature of substrate 101a of light synthesizing part 101 is R, FIG. 9B is a diagram illustrating a case where the visual line direction of the observer is the front in the case where the curvature of substrate 101a of light synthesizing part 101 is R, and FIG. 9C is a diagram illustrating a case where the visual line direction of the observer is the downward direction in the case where the curvature of substrate 101a of light synthesizing part 101 is R. In this exemplary embodiment, substrate 101a of light synthesizing part 101 is configured such that wavelength-selectivity film 101b is formed on transparent substrate 101a having curvature R with center P of optical pupil 201 as the center.

Incident angle $\theta_1$ degree from pupil center P to light synthesizing part 101 when the visual line direction of optical pupil 201 of the observer is directed upward in FIG. 9A, incident angle $\theta_2$ degree from pupil center P to light synthesizing part 101 when the visual line direction of optical pupil 201 of the observer is directed to the front in FIG. 9B, and incident angle $\theta_3$ degree from pupil center P to light synthesizing part 101 when the visual line direction of optical pupil 201 of the observer is directed downward in FIG. 9C hardly changes, and are nearly the same.

In this exemplary embodiment, curvature R of substrate 101a is set to 70 mm, a distance from a foremost surface of an eyeball to a curvature center of substrate 101a is set to 35 mm. An angle of view can be widely set by the set value of curvature R of substrate 101a.

In this exemplary embodiment, image light generator 102 is installed at an angle of 15 degrees to a vertical direction of optical pupil 201. Therefore, the wavelength characteristic of wavelength-selectivity film 101b shifts due to an incident angle at which image light from image light generator 102 enters light synthesizing part 101, and an incident angle of reflected light to pupil center P, and therefore the wavelength characteristic of wavelength-selectivity film 101b is previously shifted to be set.

[4. Effects]

As described above, the display apparatus of this exemplary embodiment includes an image light generator that generates image light by use of light in each of at least a first wavelength band, a second wavelength band, and a third wavelength band, and a light synthesizing part that transmits external light and reflects the image light. The light synthesizing part has a transparent substrate having a concave surface on which the image light is reflected, and a film that is provided on the concave surface of the substrate, reflects the image light, and transmits light in a predetermined wavelength band of the external light.

Consequently, an image and an external field can be observed at the same time without blocking of illumination light having a peak at a specific wavelength, or blocking of external light of an LED signal at the same time that image light of the display device is reflected by a combiner of the light synthesizing part having wavelength-selectivity.

Furthermore, the light synthesizing part is configured from the transparent concave plate having curvature R, and the wavelength-selectivity film, and an angle, at which light enters a pupil, hardly changes even when a visual line moves or an angle of view of image light is wide, and therefore it is possible to greatly reduce a shift of a wavelength due to incident angle dependence of the wavelength-selectivity film, namely a color shift.

The present disclosure relates to a display apparatus such as an HMD in which an image can be overlapped with an external field to be observed. Particularly, the present disclosure is applicable to work support usage such as inspection and picking.

The invention claimed is:

1. A display apparatus comprising:
   an image light generator that generates image light by use of light in each of at least a first wavelength band, a second wavelength band, and a third wavelength band; and
   a light synthesizing part that transmits external light and reflects the image light to guide the external light and the image light to a pupil of an observer, wherein
   the light synthesizing part includes:
      a transparent substrate having a concave surface on which the image light is reflected; and
      a dielectric multilayer film that is provided on the concave surface of the substrate, reflects the image light, and transmits light in a predetermined wavelength band of the external light,
   the image light directly enters the light synthesizing part from the image light generator, and
   the dielectric multilayer film has a wavelength characteristic which shifts based on an incident angle at which the image light enters the light synthesizing part and an incident angle of the reflected light to the pupil.

2. The display apparatus according to claim 1, wherein the predetermined wavelength band of the external light is 440 nm±10 nm, 545 nm±10 nm, and 615 nm±10 nm.

3. The display apparatus according to claim 1, wherein the predetermined wavelength band of the external light is 500 nm±10 nm, 595 nm±10 nm, and 630 nm±10 nm.

4. The display apparatus according to claim 1, wherein the dielectric multilayer film is formed by a film obtained by laminating thin films made of materials having different refractive indexes.

* * * * *